(12) United States Patent
Cernohous

(10) Patent No.: US 8,178,479 B2
(45) Date of Patent: May 15, 2012

(54) COMPATIBILIZED POLYMER PROCESSING ADDITIVES

(75) Inventor: Jeffrey Jacob Cernohous, Hudson, WI (US)

(73) Assignee: Interfacial Solutions IP, LLC, River Falls, WI (US)

( * ) Notice: Subject to any disclaimer, the term of this patent is extended or adjusted under 35 U.S.C. 154(b) by 483 days.

(21) Appl. No.: 12/226,720

(22) PCT Filed: May 9, 2007

(86) PCT No.: PCT/US2007/011185
§ 371 (c)(1),
(2), (4) Date: Oct. 24, 2008

(87) PCT Pub. No.: WO2007/136552
PCT Pub. Date: Nov. 29, 2007

(65) Prior Publication Data
US 2009/0093383 A1    Apr. 9, 2009

Related U.S. Application Data

(60) Provisional application No. 60/798,834, filed on May 9, 2006.

(51) Int. Cl.
*C10M 107/34* (2006.01)
*C10M 107/02* (2006.01)
*C10M 107/32* (2006.01)

(52) U.S. Cl. ......... 508/579; 508/186; 508/469; 508/591

(58) Field of Classification Search .................. 508/186, 508/579, 469, 591
See application file for complete search history.

(56) References Cited

U.S. PATENT DOCUMENTS

| 4,013,622 A | 3/1977 | DeJuneas et al. |
| 4,159,975 A | 7/1979 | Praetorius et al. |
| 4,855,360 A | 8/1989 | Duchesne et al. |
| 5,015,693 A | 5/1991 | Duchesne et al. |
| 5,096,483 A | 3/1992 | Forster et al. |
| 5,096,493 A | 3/1992 | Hyche et al. |
| 5,457,144 A * | 10/1995 | Holy et al. ............ 524/108 |
| 5,484,475 A * | 1/1996 | Breton et al. .......... 106/31.49 |
| 5,587,429 A | 12/1996 | Priester |
| 5,801,128 A * | 9/1998 | Overstreet et al. .......... 508/159 |
| 5,830,947 A | 11/1998 | Blong et al. |
| 6,066,755 A * | 5/2000 | Koch et al. ............ 558/266 |
| 6,709,526 B1 * | 3/2004 | Bailey et al. ............ 127/29 |
| 6,984,699 B2 | 1/2006 | Niino |
| 2002/0086134 A1 | 7/2002 | Welygan et al. |
| 2004/0254268 A1 | 12/2004 | Cernohous et al. |
| 2005/0101722 A1 | 5/2005 | Briers et al. |
| 2006/0292357 A1 * | 12/2006 | Cernohous et al. ....... 428/304.4 |
| 2007/0028507 A1 * | 2/2007 | Strey et al. ............ 44/301 |
| 2008/0269388 A1 | 10/2008 | Markovich et al. |
| 2008/0312377 A1 | 12/2008 | Schmidt et al. |

FOREIGN PATENT DOCUMENTS

| CN | 1312315 A | | 9/2001 |
| EP | 1132427 A1 | | 9/2001 |
| JP | 07062162 | | 3/1995 |
| JP | 07062162 A | * | 3/1995 |
| JP | 7062162 A | | 3/1995 |
| WO | WO 99/42396 | | 8/1999 |
| WO | WO 2004087849 A1 | | 10/2004 |
| WO | WO 2005012466 A1 | * | 2/2005 |
| WO | WO 2005105868 A1 | | 11/2005 |
| WO | WO 2006102154 A2 | | 9/2006 |
| WO | WO 2006113000 A2 | | 10/2006 |
| WO | WO 2007078819 A2 | | 7/2007 |
| WO | WO 2007136552 A2 | | 11/2007 |

* cited by examiner

*Primary Examiner* — Jim Goloboy

(74) *Attorney, Agent, or Firm* — Brian E. Szymanski

(57) ABSTRACT

The present invention relates to compositions and methods for improving the melt processing of polymeric materials, and more particularly to the use of compatibilized polymer processing additives to enhance the melt processing of polymeric matrices.

20 Claims, No Drawings

COMPATIBILIZED POLYMER PROCESSING ADDITIVES

CROSS REFERENCE TO RELATED APPLICATIONS

This application claims priority to provisional patent application 60/798,834 filed on 9 May 2006.

STATEMENT OF FEDERALLY FUNDED SPONSORED RESEARCH OR DEVELOPMENT

This invention was not supported by any federal funding.

FIELD OF THE INVENTION

The present invention relates to compositions and methods for improving the melt processing of polymeric materials, and more particularly to the use of compatibilized polymer processing additives to enhance the melt processing of polymeric materials. In one embodiment, a surfactant is combined with a lubricant to form a compatibilized polymer processing additive. In a preferred embodiment, the surfactant is an amphiphilic block oligomer and the lubricant is hydrophilic. I have found that these processing additives have particular utility in improving the processibility of polyolefin polymers that are commonly utilized in blown and cast film applications. The processing additives of this invention also have particular utility for improving the processibility of filled polymers, including those filled with cellulosic materials.

BACKGROUND OF THE INVENTION

The present invention is directed to providing a cost effective solution for processing polymeric matrices. This invention also addresses the problem created through the use of interfering elements in melt processable polymeric matrices and the interfering element's adverse affect on the performance of conventional polymer processing aids and lubricants. WO20040254268 (Cernohous, et. al.) describes the combination of a coupling agent with a fluoropolymer to improve the physical properties and processibility of highly filled polyolefins. However, much higher levels of coupling agent and fluoropolymer (i.e., 1-2 wt %) are required to achieve these effects than is typical for a fluoropolymer processing additive (i.e., 0.05-0.1 wt %). It appears that this is because the processing additives described in WO20040254268 are working by a different mechanism than conventional fluoropolymer processing additives. Specifically, the processing additive in WO20040254268 appears to increase the melt strength of the composite formulation, making it more resistant to edge tear. Fluorothermoplastics, including PTFE are known in the art to improve the melt strength filled polymers and are utilized in WO20040254268. Additionally, WO20040254268 describes coupling agents that have a relatively high molecular weight and polydispersity index. This is because it is known in the art that coupling agents are more effective at improving physical properties if they are above their entanglement molecular weight. This allows them to provide good interfacial bonding between the matrix and the filler. However, it is known in the art that polymers above their entanglement molecular weight diffuse more slowly in the melt than do those that are below their entanglement molecular weight. These competing forces (i.e., molecular weight and diffusion) necessarily reduce the overall efficiency of the coupling agent at reducing interfacial tension. In blown film applications, fluoropolymers cannot be utilized at high loading levels as they can impart undesirable haze to the film as a result of their inherent incompatibility with the polyolefin matrix. Therefore, the need exists for a processing additive that: 1) eliminates melt defects in the presence of interfering additives and fillers, 2) does not impart haze in films, 3) does not negatively impact the mechanical properties of the polymer matrix and 4) are effective at a wide range of processing conditions. The processing additive of the present invention provides a cost effective solution for this problem.

BRIEF SUMMARY OF THE INVENTION

Polymeric materials possess certain viscoelastic characteristics that, when melt processed, may result in undesirable defects in the finished material. This is particularly evident when a polymer is melt processed above a critical shear rate. This can cause the surface of the extrudate to exhibit melt defects (e.g., melt fracture, surface roughness, edge tear, sharkskin). A common melt defect is a rough surface on the extrudate, and is referred to as melt fracture. Melt fracture is primarily a function of the rheology of the polymer and the temperature and speed at which the polymer is processed. This phenomenon is particularly problematic to polymeric materials that have interfering elements, including fillers. Adding fillers to polymeric systems increases the overall melt viscosity, thus making them more difficult to process and melt defects more prevalent.

Melt processable polymeric materials, hereinafter referred to as polymeric matrices, are often combined with certain fillers and/or additives to both enhance the economics and to impart desired physical characteristics to the processed material. The fillers may include various organic or inorganic materials mixed throughout the polymeric host material. For example, wood flour or wood fibers are often included with certain hydrocarbon polymers to make a composite that is suitable as structural building material upon melt processing.

Fluoropolymer processing additives are known in the art that are capable of alleviating melt defects in many polymeric materials. They are believed to function by forming a dynamic coating on the processing equipment and producing interfacial slip between the processing equipment and the polymeric material. Interfacial slip in this instance is defined as the reduction of surface tension, and subsequently shear stress, between the polymer melt and the processing equipment. Fluoropolymers are a class of materials that are known to improve processibility and eliminate melt defects in thermoplastics compositions. However, it is also known in the art that fluoropolymers can be less or even non-effective in the presence of additives or fillers having reactive sites. Additives or fillers having reactive sites can have strong interactions with the fluoropolymer, thus preventing it from properly functioning. It is also known that fluoropolymers are relatively expensive materials. Thus, much higher levels of fluoropolymer must be utilized to eliminate melt defects, a solution that is often not cost-effective for the application. Fluoropolymer processing additives, because of the dynamic nature in which they coat the die, are known to be effective only within a certain "shear rate" window, nominally 200 $s^{-1}$ to 2000 $s^{-1}$. However, many melt processes operate in ranges that expose the polymer matrix to either higher or lower degrees of shear as a result of their specific process type, throughput rates and equipment. For example, very low shear rates (<100 $s^{-1}$) are encountered for processes that extrude large profiles (e.g., pipe extrusion) and very high shear rates (>2000 $s^{-1}$) are often encountered for injection molding processes. Lubricants (i.e., stearates, steramides, waxes) often suffer from the same issues. Lubricants are also problematic in that they can reduce the overall physical properties of the extruded product that is produced and have to be utilized at relatively high loading levels to be effective. Thus, there exists a need to develop a cost-effective, non-reactive processing additive that does not negatively impact on the physical properties of the polymer matrix. The additives disclosed here offer a cost-effective solution to these problems.

DETAILED DESCRIPTION OF THE INVENTION

Conventional polymer processing aids are those materials generally recognized in the melt processing field as being capable of providing interfacial slip between the polymer melt and the processing equipment. Many fluoropolymers are known that provide this function that are based on homo and copolymers derived from vinylidene difluoride, hexafluoropropylene, and tetrafluoroethylene monomers.

Polymer processing additives, when used in commercial formulations are known for their efficiency in improving the processing of polymeric products including film, sheet, pipe, wire and cable. It is known in the art that adding fluoropolymer processing aids at low levels into a formulation can improve surface quality of the product by eliminating surface defects like melt fracture, prevent the occurrence of internal and /or external die build up, and reduce or eliminate the formation of processing induced gel particles. The use of this type of polymer processing aid may also lower the pressure in the melt and the apparent viscosity of the polymer melt and thus positively impact overall extrudate throughput or allow lower processing temperatures to be utilized. The processing additive of this invention shows improved efficacy and is more economical in use than conventional recognized fluoropolymer processing additives.

However, the methylene hydrogens of vinylidene diflouride-containing fluoropolymers are very acidic and are known to have strong interactions with fillers having surface chemistries capable of hydrogen bonding or acid-base interactions. For this reason, such materials are often ineffective at improving processability of polymeric systems containing organic (e.g., cellulosic materials) or inorganic interfering elements (e.g., talc, silica, alumina, glass fibers).

Conventionally recognized polymeric matrices and interfering elements may be utilized to form the polymeric mixture suitable for melt processing. The polymeric matrices may be either hydrocarbon or non-hydrocarbon polymers. In one embodiment, the polymeric matrix is an olefin-based polymer. The interfering elements are generally those organic or inorganic materials utilized as fillers or additives in the polymer industry (e.g., talc, mica, glass fiber, alumina, silica).

In another aspect of the invention, a cellulosic material serves as the interfering element in the polymeric matrix to form a polymeric mixture. Such composites have found extensive application and use as building materials. However, it is known that polymer wood composites (PWC) often contain 40-70% wood flour or fiber in the formulation. As a result, the melt viscosity of PWC systems is often very high, and processability is extremely poor. In PWC decking extrusion, the extrudate can suffer from a phenomenon referred to as edge tear. This arises when the material is processed at too high of a rate, causing a regular and severe tearing of the surface of the extruded composite. The additives disclosed here effectively reduce torque, reduce melt pressure and improve melt defects in polymeric matrices filled with cellulosic materials.

The present invention contemplates a compatibilized polymer processing additive comprising a surfactant and a lubricant. In a preferred embodiment, the surfactant is an amphiphilic block oligomer and the lubricant is hydrophilic. Most preferred amphiphilic block oligomers of this invention have a polyolefin compatible segment and a lubricant compatible segment. An example of such a material is a polyethylene-polyethylene oxide block oligomer (commercially produced by Baker Petrolite Inc., Sugarland, Tex.). The preferred lubricant utilized in this invention is derived from a polyalkylene oxide polymer or oligomer.

The combination of these materials produces a superior, cost effective processing additive for polymeric matrices.

The present invention also contemplates methods for melt processing the novel compositions. Non-limiting examples of melt processes amenable to this invention include methods such as blown film extrusion, cast film extrusion, profile extrusion, fiber extrusion, injection molding, blow molding, rotomolding and batch mixing.

For purposes of the present invention, the following terms used in this application are defined as follows:

"MELT DEFECTS" means undesirable problems that arise when processing a polymer matrix at elevated temperatures and under shear (e.g., melt fracture, surface roughness, edge tear, sharkskin).

"POLYMER PROCESSING ADDITIVE" means a material that when added to a formulation improves the melt processibility of the formulation (e.g., reduces melt defects).

"POLYMERIC MATRIX" means a melt processable polymeric material.

"INTERFERING ELEMENT" means a material that contains reactive surfaces or sites that have affinity for conventional processing additives or lubricants.

"MELT PROCESSABLE COMPOSITION" means a formulation that is melt processed, typically at elevated temperatures, by means of a conventional polymer processing technique such as extrusion or injection molding as an example.

"SURFACTANT" means an oligomer that improves the dispersion and uniformity of a lubricant in a polymeric matrix, by reducing the interfacial tension between these materials.

"LUBRICANT" means a material that has a melting point that is lower than the melt processing temperature of the polymer matrix and whose melt viscosity is less than 10,000 centipoise under melt processing conditions.

"OLIGOMER" means a series of connected monomeric repeating units (i.e., AAAA) whose overall molecular weight is below the lesser of the critical entanglement molecular weight known for corresponding homopolymer or 10,000 g/mol.

"POLYMER" means a series of connected monomeric repeating units (i.e., AAAA) whose overall molecular weight is above the lesser of its critical entanglement molecular weight or 10,000 g/mol.

"BLOCK OLIGOMER" means an oligomer having a structure comprising at least two immiscible blocks of monomeric repeating units (i.e., AAAA-BBBB).

"HYDROPHYLIC" means polar (i.e., water miscible or dispersible).

"HYDROPHOBIC" means nonpolar (i.e., oil miscible or dispersible).

"CELLULOSIC MATERIAL" means natural or man-made materials derived from cellulose. Cellulosic materials include for example: wood flour, wood fibers, sawdust, wood shavings, agricultural fibers, newsprint, paper, flax, hemp, grain hulls, kenaf, jute, sisal, nut shells or combinations thereof.

The compositions of the present invention reduce the melt defects encountered when melt processing polymeric matrices, that may additionally contain interfering elements. For purposes of the invention, melt processing compositions are those that are capable of being processed while at least a portion of the composition is in a molten state. Conventionally recognized melt processing methods and equipment may be employed in processing the compositions of the present invention. Non-limiting examples of melt processing practices include blown film extrusion, cast film extrusion, profile extrusion, injection molding, batch mixing, blow molding and rotomolding.

The polymeric matrix functions as the host polymer and is a primary component of the melt processable composition. A wide variety of polymers conventionally recognized in the art as suitable for melt processing are useful as the polymeric matrix. The polymeric matrix includes substantially polymers that are sometimes referred to as being difficult to melt process, especially when combined with an interfering element. They include both hydrocarbon and non-hydrocarbon polymers. Examples of useful polymeric matrices include, but are not limited to, polyamides, polyimides, polyurethanes, polyolefins, polystyrenes, polyesters, polycarbonates, polyketones, polyureas, polyvinyl resins, polyacrylates and polymethylacrylates.

Preferred polymeric matrices include, high density polyethylene (HDPE), low density polyethylene (LDPE), linear low density polyethylene (LLDPE), polypropylene (PP)), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, Liquid Crystal Polymers, polyamides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters or combinations thereof. Most preferred polymeric matrices are polyolefins.

Polymeric matrices that are derived from recycled plastics are also preferred as they are often lower in cost. However, such materials are often derived from materials coming from multiple waste streams, having vastly different melt rheologies. This can make the material very problematic to process. The processing of such materials with interfering elements can be even more problematic. The additive compositions described here provide a solution to this problem. This should have a significant commercial impact as it will allow very low cost, filled recycled plastics to be converted into useful products instead of being landfilled.

The polymeric matrix is included in the melt processable compositions in amounts of typically greater than about 30% by weight. Those skilled in the art recognize that the amount of polymeric matrix will vary depending upon, for example, the type of polymer, the type of interfering element, the processing equipment, processing conditions and the desired end product.

Useful polymeric matrices include blends of various thermoplastic polymers and blends thereof containing conventional additives such as antioxidants, light stabilizers, fillers, fibers, antiblocking agents, heat stabilizers, impact modifiers, biocides, compatibilizers, flame retardants, plasticizers, tackifiers, colorants and pigments. The polymeric matrix may be incorporated into the melt processable composition in the form of powders, pellets, granules, or in any other extrudable form.

The interfering element is generally any conventional filler or additive utilized in melt processing compositions that may adversely affect the efficacy of conventional polymer processing aids. In particular, interfering elements may substantially affect the melt fracture of a melt processable composition. Non-limiting examples of interfering elements include pigments, carbon fibers, hindered amine light stabilizers, anti-block agents, glass fibers, carbon black, aluminum oxide, silica, mica, cellulosic materials, or one or more polymers with reactive or polar groups. Examples of polymers with reactive or polar groups include, but are not limited to, polyamides, polyimides, functional polyolefins, polyesters, polyacrylates and methacrylates.

In one aspect of the invention, the interfering element is a cellulosic material. Cellulosic materials are commonly utilized in melt processable compositions to impart specific physical characteristics or to reduce cost of the finished composition. Cellulosic materials generally include natural or wood based materials having various aspect ratios, chemical compositions, densities, and physical characteristics. Non-limiting examples of cellulosic materials include wood flour, wood fibers, sawdust, wood shavings, newsprint, paper, flax, hemp, rice hulls, kenaf, jute, sisal, peanut shells. Combinations of cellulosic materials, or cellulosic materials with other interfering elements, may also be used in the melt processable composition.

The amount of the interfering element in the melt processable composition may vary depending upon the polymeric matrix and the desired physical properties of the finished composition. Those skilled in the art of melt processing are capable of selecting an appropriate amount of an interfering element to match with a specific polymeric matrix in order to achieve desired physical properties of the finished material. Typically, the interfering element may be incorporated into the melt processable composition in amounts up to about 80% by weight. Additionally, the interfering element(s), may be provided in various forms depending on the specific polymeric matrices and end use applications.

The surfactant of the additive in this invention is chosen such that it is amphiphilic. In a preferred embodiment, the surfactant has a hydrophilic and a hydrophobic segment. The surfactant of this invention is oligomeric. Preferred embodiments of this invention utilize an amphiphilic block oligomer as a surfactant. Non-limiting examples of surfactants useful in this invention include: anionic surfactants, non-ionic surfactants end-functional oligomers and block oligomers. Commercially available polyethylene-b-ethylene oxide block oligomers, and end-functionalized polyethylene oligomers (e.g., hydroxyl, carboxylic acid) are examples of surfactants that have particular utility in this invention.

Amphiphilic block oligomers are preferred surfactants in this invention. Block oligomers are defined as oligomers that have "blocks" of repeating monomeric units (e.g., AAAAA-BBBBB). In this invention, amphiphilic block oligomers are preferred. Amphiphilic block oligomers are defined as having at least two blocks that are immiscible. Non-limiting examples of amphiphilic block oligomers include those containing a hydrophilic block and a hydrophobic block (e.g., polyethylene-b-polyethylene oxide).

The lubricant of this invention can be any number of materials that are conventionally utilized in melt processing. The lubricant may be hydrophobic, hydrophilic or amphiphilic in nature. Non-limiting examples of lubricants include hydrocarbon waxes, metal stearates, stearates, alkyl amides and polyalkylene oxides and glycols. Polyethylene oxide polymers are known in the art to have lubricating properties. U.S. Pat. No. 4,159,975 Praetorius et. al, describes the use of polyethylene glycol (PEG) as a lubricant for thermoplastics. U.S. Pat. No. 4,013,622 DeJuneas et. al, describes the utility of PEG as a processing aid for polyethylene film. U.S. Pat.

No. 4,855,360 Duchesne et. al. and U.S. Pat. No. 5,830,947 Blong et. al. teaches that fluoropolymer processing additives have synergistic effects when combined with polyoxyalkylene polymers, especially for thermoplastic systems containing interfering additives (e.g. hindered amine light stabilizers). This phenomenon is explained by the fact that the polar polyoxyalkylene polymer has preferential affinity for the interfering additive, thereby limiting interaction between the fluoropolymer and the interfering additive and improving it's efficacy. Surprisingly, a lubricant, like polyethylene oxide, once compatibilized, exhibits a marked improvement in its effectiveness at reducing melt defects. Thus, lower concentrations of a compatibilized processing additive is required to eliminate melt defects, than with a conventional lubricant or surfactant alone.

The amount of polymer processing aid present in the melt processable composition is dependent upon several variables, such as for example, the polymeric matrix, the type and amount of interfering element, the type of melt processing equipment, the processing conditions, and others. Those of skill in the art are capable of selecting an appropriate amount of polymer processing aid to achieve the desired reduction in interfacial slip between the polymeric matrix and the melt processing equipment. In a preferred embodiment, the polymer processing aid is used at 0.01 to 3.0% by weight of the polymer matrix. More preferably the polymer processing aid level is between 0.05 and 1.0% and most preferably between 0.05 and 0.25%

The ratio of lubricant to surfactant can be varied. However, preferred embodiments have lubricant to surfactant ratios greater than 1:1, more preferably greater than 1.5:1 and most preferably greater than 2:1.

The melt processable composition of the invention can be prepared by any of a variety of ways. For example, the polymeric matrix and the polymer processing additive can be combined together by any of the blending means usually employed in the plastics industry, such as with a compounding mill, a Banbury mixer, or a mixing extruder in which the processing additive is uniformly distributed throughout the host polymer. The processing additive and the host polymer may be used in the form, for example, of a powder, a pellet, or a granular product. The mixing operation is most conveniently carried out at a temperature above the melting point or softening point of the processing additive, though it is also feasible to dry-blend the components in the solid state as particulates and then cause uniform distribution of the components by feeding the dry blend to a twin-screw melt extruder. The resulting melt-blended mixture can be either extruded directly into the form of the final product shape or pelletized or otherwise comminuted into a desired particulate size or size distribution and fed to an extruder, which typically will be a single-screw extruder, that melt-processes the blended mixture to form the final product shape.

Melt-processing typically is performed at a temperature from 180° to 280° C., although optimum operating temperatures are selected depending upon the melting point, melt viscosity, and thermal stability of the composition. Different types of melt processing equipment, such as extruders, may be used to process the melt processable compositions of this invention. Extruders suitable for use with the present invention are described, for example, by Rauwendaal, C., "Polymer Extrusion,"4$^{th}$ ed, Hansen-Gardner Publishers, 2001.

The polymeric matrix is included in the melt processable compositions in amounts of typically greater than about 20% by weight. Those skilled in the art recognize that the amount of polymeric matrix will vary depending upon, for example, the type of polymer, the type of filler, the processing equipment, processing conditions and the desired end product.

The melt processable composition may also include other additives to impart specific attributes on the composite composition. Non-limiting examples of such additives include antioxidants, lubricants, light stabilizers, antiblocking agents, heat stabilizers, biocides, compatibilizers, flame retardants, plasticizers, tackifiers, colorants and pigments.

The polymeric matrix is included in the melt processable compositions in amounts of typically greater than about 20% by weight. Those skilled in the art recognize that the amount of polymeric matrix will vary depending upon, for example, the type of polymer, the type of filler, the processing equipment, processing conditions and the desired end product.

The melt processable compositions may be utilized to make items such as films, building materials and automotive components. Examples include, blown film, cast film, residential decking, automotive interior components, roofing, siding, window components, and decorative trim.

EXAMPLES

TABLE 1

Material Key for Examples

| MATERIAL | DESCRIPTION |
| --- | --- |
| PP | P5M4K-007 an 11.2 MFI polypropylene commercially supplied by Huntsman (Salt Lake City, UT) |
| HDPE | P4G4Z-011 0.8 MFI high density polyethylene commercially supplied by Huntsman (Salt Lake City, UT) |
| LLDPE | Barefoot Dowlex 2020G, commercially available from Dow Chemical (Midland, MI) |
| FX5920A | A fluoropolymer PPA, commercially available from 3M/Dyneon (Oakdale, MN) |
| Surfactant | Unithox 450, a polyethylene-block-polyethylene oxide oligomer, commercially available from Baker Petrolite Corporation (Sugarland, TX) |
| Lubricant | Carbowax 8000, commercially available from Dow Chemical (Midland, MI) |
| Wood Fiber | 40 mesh hardwood fiber commercially available from American Wood Fibers (Schofield, WI) |
| Silica | Micronized volcanic ash, commercially available from Kansas Minerals Inc. (Mankato, KS) |

Sample Preparation and Characterization
I. Processing Additive Compounding

Processing additive compounds were prepared using the following protocol. Processing additive and Resin (LLDPE) were dry mixed in a plastic bag and fed into a 27 mm intermeshing co-rotating twin screw extruder using a volumetric feeder and processed through a three strand die (commercially available from American Leistritz Extruder Corporation, Sommerville, N.J.). All samples were processed at 150 rpm screw speed at 12.5 kg/hr overall throughput using the following temperature profile: Zone 1=150° C., Zone 2=165° C., Zone 3=180° C., Zone 4=190° C., Zone 5=190° C., Zone 6=190° C., Die=190° C. The resulting strands were extruded subsequently pelletized into ~¼" pellets.
II. Profile Extrusion Studies Extruded profiles were prepared and tested using the following protocol. Wood fiber was predried for 4 hours at 200° F. in a vacuum oven at less 0.1 mmHg. Resin (PP or HDPE), wood fiber, and additives optionally a selected processing additive were then dry mixed in a plastic bag and fed into a 27 mm intermeshing co-rotating twin screw extruder using a volumetric feeder and processed through a three strand die (commercially available from American Leistritz Extruder Corporation, Sommerville, N.J.). All samples were processed at 150 rpm screw speed at 12.5 kg/hr overall throughput using the following temperature profile: Zone 1=150° C., Zone 2=165° C., Zone 3=180° C., Zone 4=190° C., Zone 5=190° C., Zone 6=190° C., Die=190° C. The resulting extruded strands were subsequently pelletized into ~¼" pellets. The composite pellets were then dry blended with the appropriate amount of processing additive compound and gravity fed into a 27 mm conical twin screw extruder (commercially available from C.W. Brabender, South Hackensack, N.J.) fitted with a 2.54 cm×0.635 cm profile die. All samples were processed at 100 rpm screw speed using the following temperature profile: Zone 1=145° C., Zone 2=185° C., Zone 3=190° C., Zone 4=190° C. The pressure and torque witnessed under these processing conditions was recorded for each sample. The resulting profile was analyzed for surface quality and the degree of melt fracture was determined.

III. Capillary Extrusion Studies

The resin (e.g., LLDPE) was dry blended with the appropriate amount of processing additive compound and gravity fed into a 27 mm conical twin screw extruder (commercially available from C.W. Brabender, South Hackensack, N.J.) fitted with a capillary die having a 0.254 cm round profile opening. All samples were processed at various screw speeds using the following temperature profile: Zone 1=145° C., Zone 2=185° C., Zone 3=190° C., Zone 4=190° C. The pressure and torque witnessed under these processing conditions was recorded for each sample. The resulting strand was analyzed for surface quality and the degree of melt fracture was determined.

IV. Blown Film Extrusion Studies

The resin (e.g., LLDPE) was dry blended with the appropriate amount of processing additive compound and gravity fed into a 1.9 cm single screw extruder (commercially available from C.W. Brabender, South Hackensack, N.J.) fitted with a blown film die and take off unit. The die had a 0.05 cm gap. All samples were processed at 75 rpm screw speed using the following temperature profile: Zone 1=145° C., Zone 2=190° C., Zone 3=190° C., Zone 4=190° C. The pressure and torque witnessed under these processing conditions was recorded for each sample. The resulting film was analyzed for surface quality and the degree of melt fracture was determined.

TABLE 2

PROCESSING ADDITIVE COMPOUND FORMULATIONS FOR COMPARATIVE EXAMPLES CE1 and EXAMPLES 1-3.

| PPA | LLDPE | FX5920A | SURFACTANT | LUBRICANT |
|---|---|---|---|---|
| CE1 | 95 | 5 | — | — |
| 1 | 95 | — | 2.5 | 2.5 |
| 2 | 95 | — | 1.5 | 2.5 |
| 3 | 95 | — | 1 | 4 |

TABLE 3

PROFILE EXTRUSION FORMULATIONS FOR COMPARATIVE EXAMPLES CE2-CE9 and EXAMPLES 4-9.

| EXAMPLE | HDPE | PP | WOOD FIBER | PPA | PPA % |
|---|---|---|---|---|---|
| CE2 | 50 | — | 50 | — | — |
| CE3 | — | 50 | 50 | — | — |
| CE4 | 49 | — | 50 | CE1 | 1 |
| CE5 | 48 | — | 50 | CE1 | 2 |
| CE6 | 45 | — | 50 | CE1 | 5 |
| CE7 | — | 49 | 50 | CE1 | 1 |
| CE8 | — | 48 | 50 | CE1 | 2 |

TABLE 3-continued

PROFILE EXTRUSION FORMULATIONS FOR COMPARATIVE EXAMPLES CE2-CE9 and EXAMPLES 4-9.

| EXAMPLE | HDPE | PP | WOOD FIBER | PPA | PPA % |
|---|---|---|---|---|---|
| CE9 | — | 45 | 50 | CE1 | 5 |
| 4 | 49 | — | 50 | 3 | 1 |
| 5 | 48 | — | 50 | 3 | 2 |
| 6 | 45 | — | 50 | 3 | 5 |
| 7 | — | 49 | 50 | 3 | 1 |
| 8 | — | 48 | 50 | 3 | 2 |
| 9 | — | 45 | 50 | 3 | 5 |

TABLE 4

CAPILLARY EXTRUSION FORMULATIONS FOR COMPARATIVE EXAMPLES CE10-CE17 AND EXAMPLES 10-17.

| EXAMPLE | LLDPE | SILICA | PPA | PPA % |
|---|---|---|---|---|
| CE10 | 100 | — | — | — |
| CE11 | 99.5 | 0.5 | — | — |
| CE12 | 99 | — | CE1 | 1 |
| CE13 | 98 | — | CE1 | 2 |
| CE14 | 96 | — | CE1 | 4 |
| CE15 | 98.5 | 0.5 | CE1 | 1 |
| CE16 | 97.5 | 0.5 | CE1 | 2 |
| CE17 | 95.5 | 0.5 | CE1 | 4 |
| 10 | 99 | — | 3 | 1 |
| 11 | 98 | — | 3 | 2 |
| 12 | 96 | — | 3 | 4 |
| 13 | 98.5 | 0.5 | 3 | 1 |
| 14 | 97.5 | 0.5 | 3 | 2 |
| 15 | 95.5 | 0.5 | 3 | 4 |
| 16 | 98 | — | 1 | 1 |
| 17 | 98 | — | 2 | 1 |

TABLE 5

BLOWN FILM EXTRUSION FORMULATIONS FOR COMPARATIVE EXAMPLES CE18-CE25 AND EXAMPLES 18-23.

| EXAMPLE | LLDPE | SILICA | PPA | PPA % |
|---|---|---|---|---|
| CE18 | 100 | — | — | — |
| CE19 | 99.5 | 0.5 | — | — |
| CE20 | 99 | — | CE1 | 1 |
| CE21 | 98 | — | CE1 | 2 |
| CE22 | 96 | — | CE1 | 4 |
| CE23 | 98.5 | 0.5 | CE1 | 1 |
| CE24 | 97.5 | 0.5 | CE1 | 2 |
| CE25 | 95.5 | 0.5 | CE1 | 4 |
| 18 | 99 | — | 3 | 1 |
| 19 | 98 | — | 3 | 2 |
| 20 | 96 | — | 3 | 4 |
| 21 | 98.5 | 0.5 | 3 | 1 |
| 22 | 97.5 | 0.5 | 3 | 2 |
| 23 | 95.5 | 0.5 | 3 | 4 |

TABLE 6

PRESSURE, TORQUE AND % MELT DEFECTS OBSERVED FOR COMPARATIVE EXAMPLES CE2-CE24 AND EXAMPLES 4-23.

| EXAMPLE | TORQUE (mg) | PRESSURE (MPa) | MELT DEFECTS (%) |
|---|---|---|---|
| CE2 | 1900 | 1300 | 75 |
| CE3 | 900 | 600 | 100 |
| CE4 | 1900 | 1300 | 75 |
| CE5 | 1900 | 1275 | 75 |
| CE6 | 1900 | 1300 | 75 |
| CE7 | 880 | 600 | 100 |

TABLE 6-continued

PRESSURE, TORQUE AND % MELT DEFECTS OBSERVED FOR COMPARATIVE EXAMPLES CE2-CE24 AND EXAMPLES 4-23.

| EXAMPLE | TORQUE (mg) | PRESSURE (MPa) | MELT DEFECTS (%) |
|---|---|---|---|
| CE8 | 880 | 600 | 100 |
| CE9 | 880 | 600 | 100 |
| CE10 | 3950 | 1860 | 100 |
| CE11 | 4050 | 1980 | 100 |
| CE12 | 3650 | 1800 | 75 |
| CE13 | 3120 | 2990 | 0 |
| CE14 | 2650 | 1710 | 0 |
| CE15 | 3850 | 1950 | 100 |
| CE16 | 3700 | 1900 | 100 |
| CE17 | 2850 | 1780 | 60 |
| CE18 | 3860 | 1420 | 100 |
| CE19 | 4050 | 1990 | 100 |
| CE20 | 3150 | 1330 | 25 |
| CE21 | 2670 | 1230 | 0 |
| CE22 | 2230 | 1160 | 0 |
| CE23 | 3320 | 1560 | 75 |
| CE24 | 2890 | 1410 | 10 |
| CE25 | 2430 | 1270 | 0 |
| 4 | 1250 | 970 | 75 |
| 5 | 1180 | 900 | 60 |
| 6 | 1000 | 840 | 25 |
| 7 | 780 | 600 | 80 |
| 8 | 700 | 580 | 40 |
| 9 | 660 | 570 | 20 |
| 10 | 2400 | 990 | 10 |
| 11 | 2240 | 950 | 0 |
| 12 | 1920 | 840 | 0 |
| 13 | 2510 | 970 | 0 |
| 14 | 1850 | 860 | 0 |
| 15 | 1790 | 780 | 0 |
| 16 | 2810 | 1030 | 25 |
| 17 | 2560 | 980 | 25 |
| 18 | 2700 | 980 | 50 |
| 19 | 2250 | 810 | 0 |
| 20 | 1950 | 750 | 0 |
| 21 | 2700 | 840 | 0 |
| 22 | 2200 | 800 | 0 |
| 23 | 1950 | 750 | 0 |

From the examples given above, the processing additive of this invention effectively reduces pressure, torque and improves processibility of polymeric matrices with and without interfering elements present.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A composition of matter comprising:
   (a) a polymeric matrix;
   (b) a hydrophilic or hydrophobic lubricant; and
   (c) an amphiphilic surfactant having a segment miscible with the lubricant, and another segment miscible with the polymeric matrix during melt processing of the polymeric matrix.

2. The composition of claim 1, wherein the lubricant is a polyalkylene oxide oligomer or polymer.

3. The composition of claim 1, wherein the surfactant is a block oligomer.

4. The composition of claim 3, wherein the surfactant is a polyethylene-block-polyalkylene oxide oligomer.

5. The composition of claim 1, wherein the surfactant is an end-functionalized oligomer.

6. The composition of claim 1, wherein the surfactant has an overall molecular weight of less than 5,000 g/mol.

7. The composition of claim 1 wherein said polymeric matrix is selected from the group consisting of polyolefins, polyolefin copolymers, polystyrenes, polystyrene copolymers, polyacrylates, polymethacrylates, polyesters, polyvinylchloride, fluoropolymers, liquid crystal polymers, polyamides, polyether imides, polyphenylene sulfides, polysulfones, polyacetals, polycarbonates, polyphenylen oxides, polyurethanes, thermoplastic elastomers, polyamides, epoxies, alkyds, melamines, phenolics, ureas, vinyl esters, combinations thereof.

8. The composition of claim 1, wherein the polymeric matrix is derived from a recycled material.

9. The composition of claim 1, wherein the polymeric matrix is a polyolefin.

10. The composition of claim 1, further comprising an interfering element.

11. The composition of claim 10, wherein said interfering element includes at least one of pigments, carbon fibers, light stabilizers, heat stabilizers, antistatic agents, hydrotalcite, anti-block agents, glass fibers, carbon black, aluminum oxide, silica, mica, calcium carbonate, or one or more polymers with reactive or polar groups.

12. The composition of claim 11, wherein said at least one polymer with reactive or polar groups includes at least one of polyamides, polyimides, functional polyolefin, polyesters, polyacrylates and methacrylates.

13. The composition of claim 10, wherein said interfering element is a cellulosic material including wood flour, wood fibers, agricultural fibers, sawdust, wood shavings, newsprint, paper, flax, hemp, rain hulls, kenaf, jute, sisal, nut shells or combinations thereof.

14. The composition of claim 13, wherein the composition comprises between 0.005 to 80% by weight of the interfering element.

15. The composition of claim 13, wherein said the composition comprises between 25 to 65% by weight of the interfering element.

16. A method for forming an article, comprising melt-processing a polymer matrix, a hydrophilic or hydrophobic lubricant, an optional interfering element, and an amphiphilic surfactant having a segment miscible with the lubricant, and another segment miscible with the polymeric matrix.

17. The method of claim 16, wherein the composition does not exhibit melt defects upon melt-processing.

18. The method of claim 16, wherein said melt-processing includes at least one of film extrusion, fiber extrusion, profile extrusion, injection molding, and blow molding.

19. The method of claim 16, wherein said method is utilized to form at least one of films, fibers, building materials and automotive components.

20. A composition comprising:
   (a) a lubricant, wherein the lubricant is a polyalkylene oxide oligomer or polymer; and
   (b) an amphiphilic surfactant, wherein the surfactant is a polyethylene-block-polyalkylene oxide oligomer having a segment miscible with the lubricant, and another segment miscible with a hydrophobic polymeric matrix.

* * * * *